US007002662B2

(12) United States Patent
Umeya

(10) Patent No.: US 7,002,662 B2
(45) Date of Patent: Feb. 21, 2006

(54) METHOD OF PRODUCING OPTICAL ELEMENT BY PATTERNING LIQUID CRYSTAL FILMS

(75) Inventor: Masanori Umeya, Tokyo-To (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 10/270,096

(22) Filed: Oct. 15, 2002

(65) Prior Publication Data

US 2003/0071960 A1    Apr. 17, 2003

(30) Foreign Application Priority Data

Oct. 16, 2001    (JP)    ............................. 2001-317965

(51) Int. Cl.
*G02F 1/13*    (2006.01)
(52) U.S. Cl. ...................... 349/193; 349/187; 349/194; 349/115; 349/106; 359/483; 359/502; 430/20
(58) Field of Classification Search ................ 349/115, 349/187, 106, 193–194; 359/483, 502, 503; 430/20
See application file for complete search history.

(56) References Cited

U.S. PATENT DOCUMENTS

| 5,750,641 A * | 5/1998 | Ezzell et al. ................ 528/353 |
| 6,417,902 B1 * | 7/2002 | Greenfield et al. ......... 349/115 |
| 6,421,107 B1 * | 7/2002 | Greenfield et al. ......... 349/115 |

FOREIGN PATENT DOCUMENTS

| EP | 0 444 703 A2 | 9/1991 |
| GB | 2 324 881 A | 11/1998 |
| JP | 2-74924 | 3/1990 |
| JP | 8-320480 | 12/1996 |
| JP | 9-304613 | 11/1997 |
| JP | 10-282324 | 10/1998 |
| JP | A 11-14973 | 1/1999 |
| JP | 11-153789 | 6/1999 |
| JP | 11-337716 | 12/1999 |
| JP | 2000-258623 | 9/2000 |
| JP | 2000-292784 | 10/2000 |
| JP | 2000-347176 | 12/2000 |
| JP | 2001-4822 | 1/2001 |
| JP | 2001-4824 | 1/2001 |
| JP | 2001242315 | 9/2001 |

* cited by examiner

*Primary Examiner*—Dung T. Nguyen
*Assistant Examiner*—George Wang
(74) *Attorney, Agent, or Firm*—Oliff & Berridge, PLC

(57) ABSTRACT

A method for making an optical element from patterned liquid crystal films by placing a radiation-curing liquid crystal on an aligning function substrate surface, radiating selectively a portion of the liquid crystal film partially to cure it, contacting the partially cured film with an organic solvent to remove the uncured portion of the film and form a pattern in the film, and applying another radiation-curing liquid crystal to a surface of the first film exposed by removing the uncured portion, thereby forming and patterning the second liquid crystal film. The solvent does not dissolve the substrate surface.

5 Claims, 3 Drawing Sheets

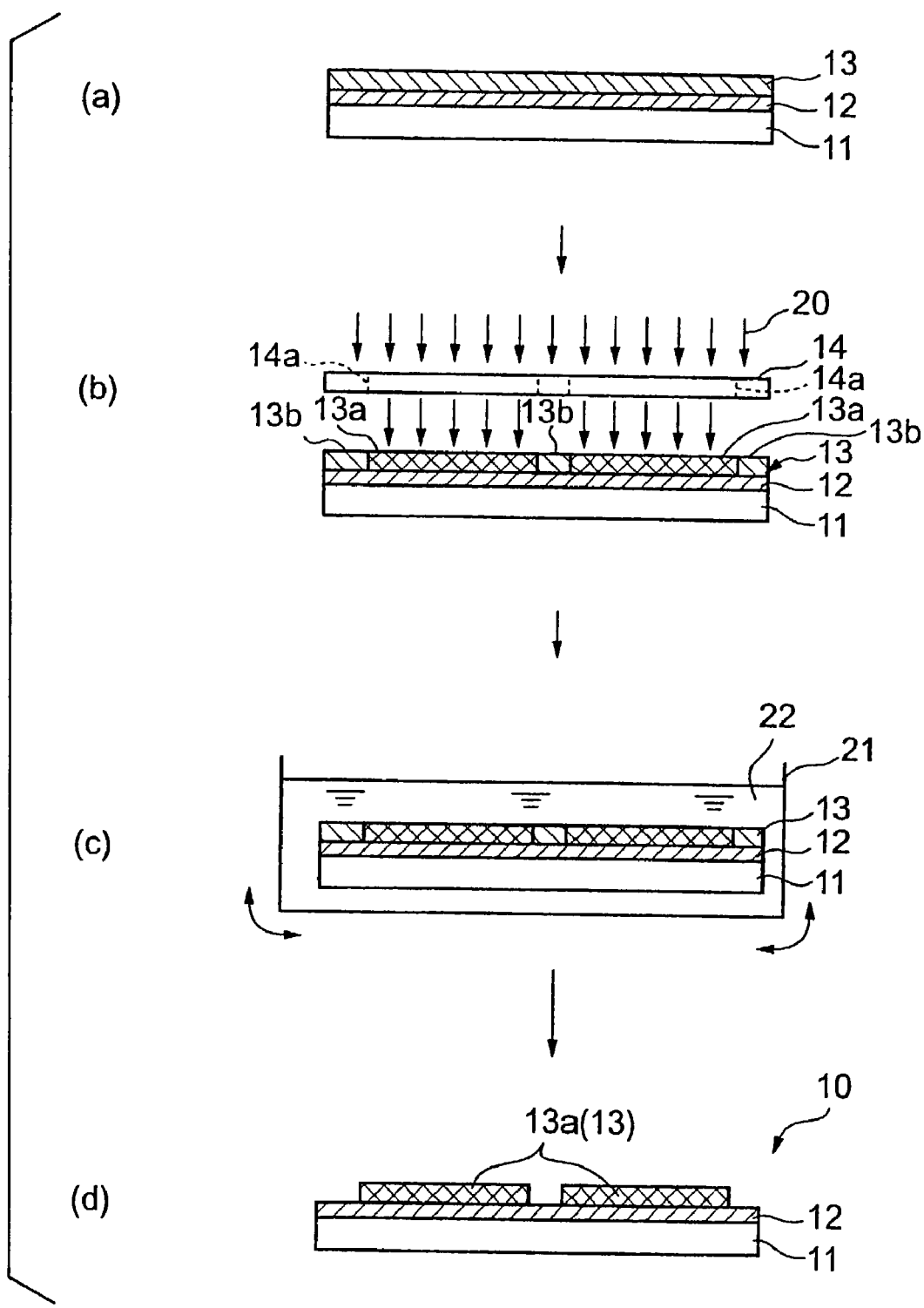
F I G. 1

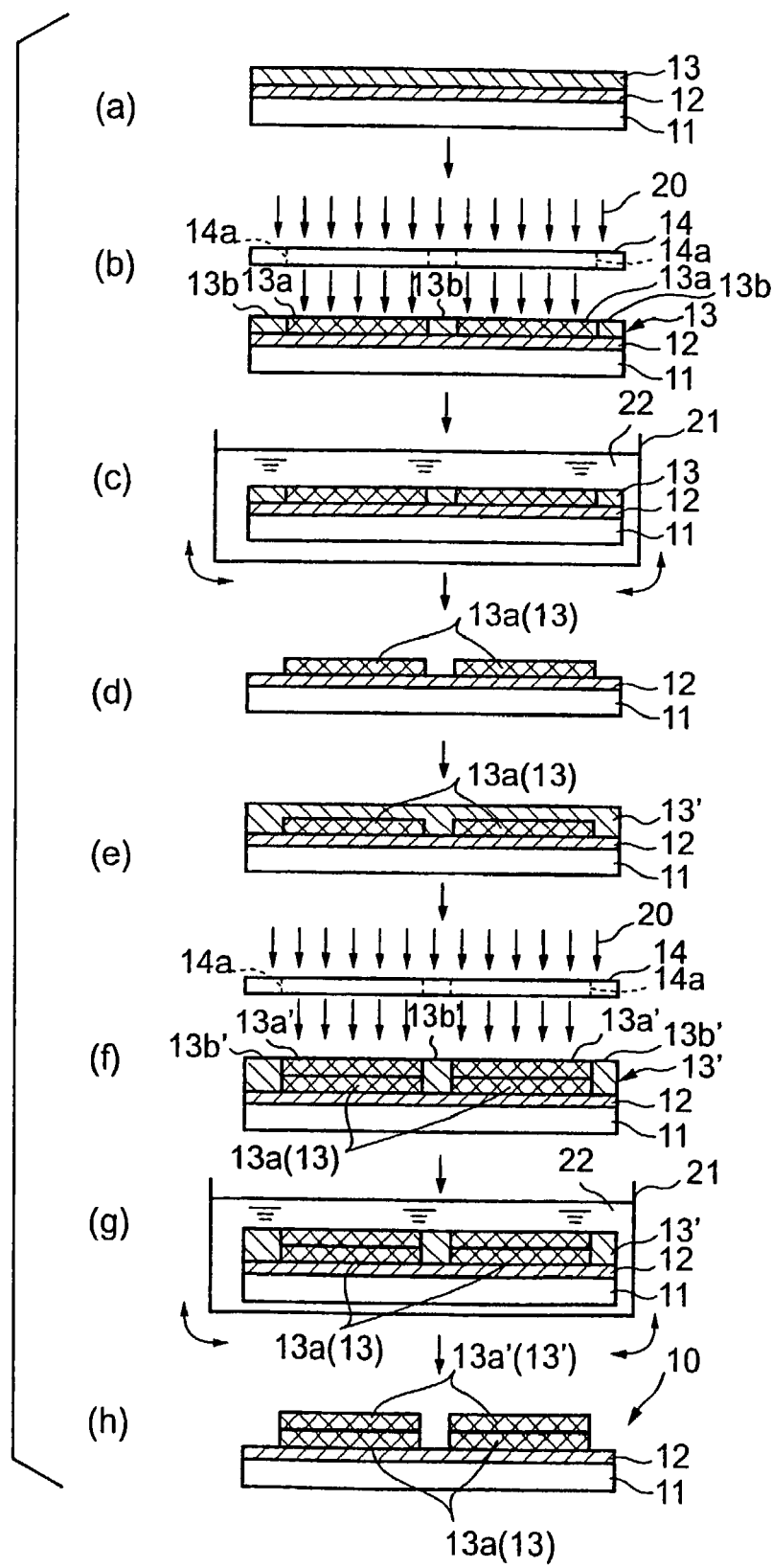
F I G. 2

METHOD OF PRODUCING OPTICAL ELEMENT BY PATTERNING LIQUID CRYSTAL FILMS

BACKGROUND OF THE INVENTION

1. Field of the Invention

The present invention relates to a process for producing an optical element such as a circularly-polarized-light-separating element or a color filter, and particularly to a method of producing an optical element by patterning liquid crystal films.

2. Description of Related Art

There has conventionally been known a process for producing an optical element such as a circularly-polarized-light-separating element or a color filter by the use of liquid crystal films having cholesteric regularity (cholesteric films). In such a process for producing an optical element, it is necessary to form a pattern whose outline coincides with the external shape of the optical element, or to form red-, green- and blue-colored patterns. There is, therefore, a demand for a method of patterning cholesteric liquid crystal films with high precision and efficiency.

Conventionally known methods of forming red-, green- and blue- colored patterns are as follows: (1) a method utilizing temperature changes to control the colors of cholesteric liquid crystal films, in which when a cholesteric liquid crystal film has turned the desired color, ultraviolet light is applied, through a mask, to a part of the cholesteric liquid crystal film so as to cure it in a desired pattern (see Japanese Laid-Open Patent Publications No. 258623/2000, No. 304613/1997 and No. 320480/1996); (2) a method in which liquid crystals of red, green and blue are embedded in grooves that have been provided in a predetermined pattern on a substrate (see Japanese Laid-Open Patent Publications No. 337716/1999 and No. 282324/1998); and (3) a method in which cholesteric liquid crystal films of different colors, patterned as desired, are successively transferred to one substrate (see Japanese Laid-Open Patent Publications No. 4824/2001 and No. 4822/2001).

The above-described method (1) utilizes temperature changes to control colors, so that this method has such problems that patterning precision is low and that the patterned cholesteric liquid crystal films of different colors show extremely poor optical properties at the boundaries between them. Moreover, although it is possible, by this method, to form red-, green- and blue-colored patterns on one cholesteric liquid crystal film, it is impossible to form the colored patterns by removing a part of a cholesteric liquid crystal film. The method (1) is thus disadvantageous in that a cholesteric liquid crystal film cannot be patterned into a shape whose outline coincides with the external shape of an optical element.

In the above-described method (2), liquid crystals are embedded in grooves that have been provided in a predetermined pattern on a substrate. Problems with this method are, therefore, such that colored patterns cannot be obtained with high positional precision and thickness precision and that many hours are required for production.

The above-described method (3) requires complicated production processes. Moreover, the patterned cholesteric liquid crystal films obtained by this method are poor in optical properties, heat resistance, chemical resistance, etc.

In addition to the aforementioned methods (1), (2) and (3), there has been proposed a method in which ultraviolet light is applied, through a mask, to cholesteric liquid crystal films of red, green and blue to form red-, green- and blue-colored patterns (see Japanese Laid-Open Patent Publication No. 153789/1999). In this method, it is necessary to remove the uncured portion of the cholesteric liquid crystal films. Usually used for this purpose is a technique of physically separating the uncured portion of a cholesteric liquid crystal film. One problem with this technique is that high thickness precision cannot be attained at the boundaries between patterns of different colors. In addition, the surface of the substrate having the function of aligning liquid crystalline molecules tends to be damaged, so that when a liquid crystal is applied again to this surface, liquid crystalline molecules in this liquid crystal are not easily aligned.

In the connection with this method, known is a method of removing the uncured portion of the cholesteric liquid crystal film by the use of an organic solvent (see Japanese Laid-Open Patent Publication No. 74924/1990). However, this method is merely meant for forming a single liquid crystal film on a substrate; and there is no consideration for how the organic solvent affects the aligning function of the substrate or the liquid crystal film.

SUMMARY OF THE INVENTION

The present invention was accomplished in the light of the aforementioned drawbacks in the related art. An object of the present invention is therefore to provide a method of producing an optical element having excellent optical properties by patterning liquid crystal films in the same or different patterns on a substrate with high precision and efficiency.

A first aspect of the present invention is a method of producing an optical element by patterning a plurality of liquid crystal films, comprising: a first step of applying a first radiation-curing liquid crystal to a surface of a substrate having an aligning function, so as to form on the substrate a first liquid crystal film in an uncured state; a second step of selectively applying radiation to a predetermined portion of the first liquid crystal film so as to partially cure the first liquid crystal film; a third step of bringing the partially cured first liquid crystal film into contact with an organic solvent to remove an uncured portion of the first liquid crystal film, thereby forming the first liquid crystal film in a predetermined pattern; and a fourth step of applying a second radiation-curing liquid crystal to a surface of the first liquid crystal film, which remains on the substrate after removing the uncured portion of the first liquid crystal film, thereby forming a second liquid crystal film in a predetermined pattern; wherein, in the second step, the radiation-applied-portion of the first liquid crystal film is cured to such an extent that 90% or more of the first radiation-curing liquid crystal is cured, so as to keep the aligning function of the surface of the first liquid crystal film, to which the second radiation-curing liquid crystal is applied in the fourth step.

In the above-described first aspect of the present invention, it is preferable that the first and second liquid crystal films have cholesteric regularity.

It is also preferable that the fourth step includes the steps of: applying a second radiation-curing liquid crystal to the surface of the first liquid crystal film so as to form on the first liquid crystal film a second liquid crystal film in an uncured state; selectively applying radiation to a predetermined portion of the second liquid crystal film so as to partially cure the second liquid crystal film; and bringing the partially cured second liquid crystal film into contact with an organic solvent to remove an uncured portion of the second liquid crystal film, thereby forming the second liquid crystal film in a predetermined pattern.

In addition, it is preferable that the first and second liquid crystal films having cholesteric regularity and comprise liquid crystals having different selective reflection wavelengths; and the first and second liquid crystal films are formed on the substrate in such patterns that they are overlapped each other, thereby forming on the substrate a reflective layer capable of selectively reflecting light in a wide range.

A second aspect of the present invention is a method of producing an optical element by patterning a plurality of liquid crystal films, comprising: a first step of applying a first radiation-curing liquid crystal to a surface of a substrate having an aligning function, so as to form on the substrate a first liquid crystal film in an uncured state; a second step of selectively applying radiation to a predetermined portion of the first liquid crystal film to partially cure the first liquid crystal film; a third step of bringing the partially cured first liquid crystal film into contact with an organic solvent to remove an uncured portion of the first liquid crystal film, thereby forming the first liquid crystal film in a predetermined pattern; and a fourth step of applying a second radiation-curing liquid crystal to an exposed surface of the substrate exposed by removal of the uncured portion of the first liquid crystal film, thereby forming a second liquid crystal film in a predetermined pattern; wherein the organic solvent used in the third step is one that does not dissolve the surface of the substrate so as to keep the aligning function of the exposed surface of the substrate, to which the second radiation-curing liquid crystal is applied in the fourth step.

In the above-described second aspect of the present invention, it is preferable that, in the fourth step, the second radiation-curing liquid crystal is applied to a surface of the first liquid crystal film, which remains on the substrate after removing the uncured portion of the first liquid crystal film, as well as the exposed surface of the substrate; and, in the second step, the radiation-applied-portion of the first liquid crystal film is cured to such an extent that 90% or more of the first radiation-curing liquid crystal is cured, so as to keep the aligning function of the surface of the first liquid crystal film, to which the second radiation-curing liquid crystal is applied in the fourth step.

It is also preferable that the first and second liquid crystal films have cholesteric regularity.

In addition, it is preferable that the fourth step includes the steps of: applying a second radiation-curing liquid crystal to the exposed surface of the substrate, so as to form on the substrate a second liquid crystal film in an uncured state; selectively applying radiation to a predetermined portion of the second liquid crystal film so as to partially cure the second liquid crystal film; and bringing the partially cured second liquid crystal film into contact with an organic solvent to remove an uncured portion of the second liquid crystal film, thereby forming the second liquid crystal film in a predetermined pattern.

A third aspect of the present invention is a method of producing an optical element by patterning a plurality of liquid crystal films, comprising: the first step of applying a radiation-curing liquid crystal having cholesteric regularity to a surface of a substrate having an aligning function, so as to form on the substrate a liquid crystal film in an uncured state; the second step of selectively applying radiation to a predetermined portion of the liquid crystal film to partially cure the liquid crystal film; and the third step of bringing the partially cured liquid crystal film into contact with an organic solvent to remove an uncured portion of the liquid crystal film, thereby forming the liquid crystal film in a predetermined pattern; wherein the organic solvent used in the third step is one that does not dissolve the surface of the substrate so as to keep the aligning function of the exposed surface of the substrate; and the first, second and third steps are successively repeated for each of three liquid crystals having selective reflection wavelengths of red, green and blue, thereby forming on the substrate a plurality of liquid crystal films in different patterns so as to form on the substrate red-, green- and blue-colored layers.

The "radiation" as used herein refers to one that acts on radiation-curing liquid crystals such as photopolymerizable liquid crystals to cause photopolymerization reaction or the like, and usually used as the radiation is ultraviolet light or an electron beam.

According to the present invention, a liquid crystal film in the desired pattern is obtained by selectively applying radiation to the desired portion of a liquid crystal film formed on a substrate having the aligning function, so as to partially cure the liquid crystal film, and then bringing the partially cured liquid crystal film into contact with an organic solvent to remove the uncured portion of the liquid crystal film. It is, therefore, possible to pattern the liquid crystal film as desired with high accuracy and efficiency while maintaining film-thickness precision high.

In particular, according to the present invention, in the aforementioned step of selectively applying radiation to the desired portion of the liquid crystal film to partially cure it, the radiation-applied-portion of the first liquid crystal film may be cured to such an extent that 90% or more of the first radiation-curing liquid crystal is cured. In this case, even when a liquid crystal is applied again to the surface of the liquid crystal film, liquid crystalline molecules in this liquid crystal are properly aligned. It is thus possible to form, on one substrate, a plurality of liquid crystal films in such patterns that they are overlapped each other, with high precision and efficiency.

Also, according to the present invention, in the aforementioned step of bringing the partially cured liquid crystal film into contact with an organic solvent to remove the uncured portion of it, as the organic solvent, an organic solvent that does not dissolve the surface of a substrate having the aligning function may be used. In this case, even when a liquid crystal is applied again to the surface of the substrate, liquid crystalline molecules in this liquid crystal are properly aligned. It is thus possible to form, on one substrate, a plurality of liquid crystal films in different patterns, with high precision and efficiency.

BRIEF DESCRIPTION OF THE DRAWINGS

In the drawings,

FIG. 1 is a view for illustrating a method of patterning liquid crystal films, which is used in the present invention;

FIG. 2 is a view for illustrating a method according to an embodiment of the present invention, in which an optical element is produced by patterning liquid crystal films.

DETAILED DESCRIPTION OF PREFERRED EMBODIMENTS

Figure 3:
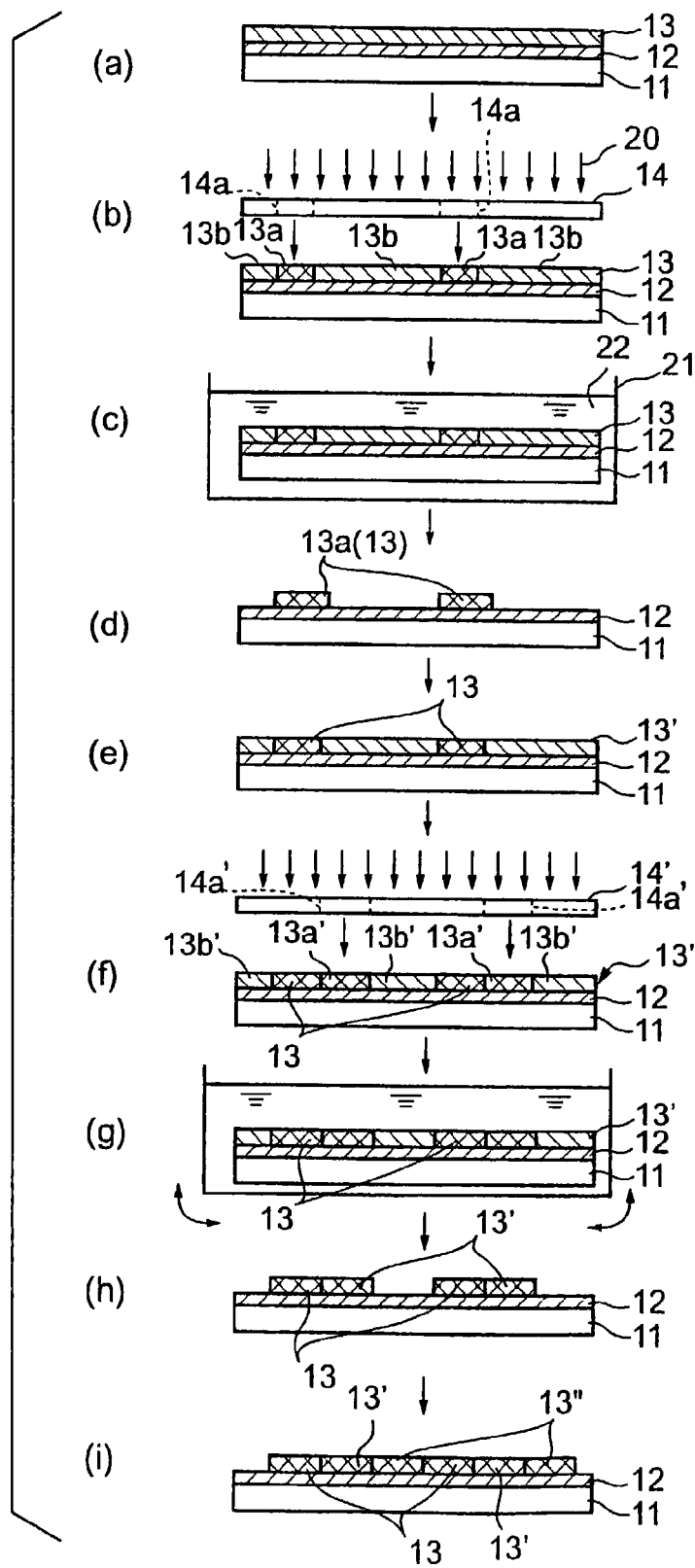
FIG. 3 is a view for illustrating a method according to a further embodiment of the present invention, in which an optical element is produced by patterning liquid crystal films.

By referring to the accompanying drawings, embodiments of the present invention will be described hereinafter.

A method of patterning liquid crystal films, which is used in the present invention, is firstly described by referring to FIG. 1.

A glass substrate 11, to which an alignment layer 12 made of a polyimide film or the like is adhered, is prepared as the substrate having the function of aligning liquid crystalline molecules (aligning function). To the surface of this alignment layer 12, a radiation-curing liquid crystal, such as a photopolymerizable liquid crystal, having cholesteric regularity is applied to form a first cholesteric liquid crystal film 13 in the uncured state (FIG. 1(a)). Liquid crystalline molecules in the first cholesteric liquid crystal film 13 are aligned by the alignment-regulating action of the surface of the alignment layer 12. Besides the glass substrate 11 provided with the alignment layer 12, an oriented PET (polyethylene terephthalate) film or the like may be used as the substrate having the function of aligning liquid crystalline molecules. Any of polymerizable monomers, polymerizable oligomers, liquid crystalline polymers and the like can be used as the liquid crystalline material (radiation-curing liquid crystal) to form the first cholesteric liquid crystal film 13. In the case where ultraviolet light is used to cure the first cholesteric liquid crystal film 13, a photopolymerization initiator is added to the liquid crystalline material beforehand. In general, such a photopolymerization initiator as "Irg 369", "Irg 907" or "Irg 184" available from Ciba Specialty Chemicals K.K., Japan may be used. In the case where an electron beam is used to cure the first cholesteric liquid crystal film 13, it is not necessary to add such a photopolymerization initiator to the liquid crystalline material. The liquid crystalline material that is used to form the first cholesteric liquid crystal film 13 may be made into a coating liquid by dissolving it in a solvent. In this case, it is necessary to add, prior to the next step (FIG. 1(b)), the drying step of evaporating the solvent.

Next, radiation 20 is selectively applied, through a photomask 14, to the desired portions of the first cholesteric liquid crystal film 13 to partially cure the first cholesteric liquid crystal film 13 (FIG. 1(b)). By this, the portions of the first cholesteric liquid crystal film 13 corresponding to the openings 14a of the photomask 14 are cured (cured portions 13a), and the other portions of the first cholesteric liquid crystal film 13 remain uncured (uncured portions 13b). In this step, it is preferable to cure the radiation-applied-portions of the first cholesteric liquid crystal film 13 (cured portions 13a) to such an extent that 90% or more of the radiation-curing liquid crystal is cured. By doing so, even when the first cholesteric liquid crystal film 13 is brought into contact with an organic solvent 22 in the next step (FIG. 1(c)), the cured portions 13a of the first cholesteric liquid crystal film 13 do not undergo deterioration of optical properties and swelling. Also, it is possible to prevent the surface of the cured portions 13a of the first cholesteric liquid crystal film 13 from being dissolved by the organic solvent 22 and undergoing deterioration of the aligning function thereof.

Thereafter, the glass substrate 11 provided with the alignment layer 12, on which the first cholesteric liquid crystal film 13 has been formed, is immersed in an organic solvent 22 placed in a barrel 21, thereby bringing the partially cured first cholesteric liquid crystal film 13 into contact with the organic solvent 22. By rocking the barrel 21 with the glass substrate 11 fixed in the barrel 21, the uncured portions 13b of the first cholesteric liquid crystal film 13 are removed (FIG. 1(c)). To remove the uncured portions with the organic solvent 22, a spin-cleaning method may be adopted instead of the above-described rock-cleaning method. Further, the organic solvent 22 is preferably one that can dissolve the cholesteric liquid crystal film in the uncured state and that does not dissolve the surface of the substrate having the aligning function (a glass substrate provided with an alignment layer, or an oriented PET film). As long as such an organic solvent is used, the alignment-regulating action of the surface of the substrate is not impaired, and even when the radiation-curing liquid crystal is applied again to the surface of the substrate, liquid crystalline molecules in this liquid crystal are properly aligned. Specifically, acetone, 3-methoxybutyl acetate, diglyme, cyclohexanone, THF (tetrahydrofuran), toluene, methylene chloride or MEK (methyl ethyl ketone), for example, can be used as the organic solvent that does not dissolve the surface of an alignment layer (polyimide film) or of an oriented PET film. On the other hand, γ-butyrolactone, NMP (N-methyl-2-pyrrolidone), 1,3-dioxolane, etc. are organic solvents that dissolve the surface of an alignment layer (polyimide film) or of an oriented PET film. The latter organic solvents are not suitable to be used in the present invention as long as the organic solvents are used in usual manners. However, those organic solvents can be preferably used in the case where they are mixed with the organic solvent that does not dissolve the surface of an alignment layer (polyimide film) or of an oriented PET film, or in the case where the concentrations of them are very thin. For instance, those organic solvents can be preferably used for adjusting the speed of development (removing the liquid crystal films).

Thus, an optical element 10 having the first cholesteric liquid crystal film 13 patterned as desired (cured portions 13a), formed on the glass substrate 11 provided with the alignment layer 12, is obtained (FIG. 1(d)).

After thus patterning the first cholesteric liquid crystal film 13, an additional or second cholesteric liquid crystal film is formed and patterned in the same manner as that described referring to FIG. 1.

Specifically, as shown in FIG. 2, after forming a first cholesteric liquid crystal film 13 in the desired pattern (FIGS. 2(a), (b), (c) and (d)), a radiation-curing liquid crystal is applied to the surface of the cured portions 13a (liquid crystal film 13) remaining on the substrate after removing the uncured portions 13b, or to the surface of the alignment layer 12 exposed by the removal of the uncured portions 13b, thereby forming a second liquid crystal film 13' in the uncured state (FIG. 2(e)).

Next, radiation 20 is selectively applied, through a photomask 14, to the desired portions of the second cholesteric liquid crystal film 13' to partially cure the second cholesteric liquid crystal film 13' (FIG. 2(f)). By this, those portions of the second cholesteric liquid crystal film 13' corresponding to the openings 14a of the photomask 14 are cured (cured portions 13a'), and the other portions of the second cholesteric liquid crystal film 13' remain uncured (uncured portions 13b').

Thereafter, the glass substrate 11 provided with the alignment layer 12, on which the cholesteric liquid crystal films 13 and 13' have been formed, is immersed in an organic solvent 22 placed in a barrel 21, thereby bringing the partially cured second cholesteric liquid crystal film 13' into contact with the organic solvent 22. By rocking the barrel 21 with the glass substrate 11 fixed in the barrel 21, the uncured portions 13b' of the second cholesteric liquid crystal film 13' are removed (FIG. 2(g)).

Thus, an optical element 10 having the cholesteric liquid crystal films 13 and 13' patterned as desired (cured portions 13a and 13a'), formed on the glass substrate 11 provided with the alignment layer 12, is finally obtained (FIG. 2(h)).

In the method shown in FIG. 2, if liquid crystals having different selective reflection wavelengths are used to make the selective reflection wave ranges of the cholesteric liquid crystal films 13 and 13' different, a circularly polarizing element having a wade selective reflection wave range can be obtained as the optical element 10.

Furthermore, in the method shown in FIG. 2, the two cholesteric liquid crystal films 13 and 13' that are in the same pattern are laminated to the glass substrate 11 provided with the alignment layer 12. However, the second cholesteric liquid crystal film 13' may also be formed in a pattern different from that of the first cholesteric liquid crystal film 13.

Specifically, as shown in FIG. 3, after forming a first cholesteric liquid crystal film 13 in the desired pattern in the same manner as that described referring to FIG. 1 (FIGS. 3(a), (b), (c) and (d)), a radiation-curing liquid crystal is applied to the surface of the alignment layer 12 exposed by the removal of the uncured portions 13b of the first cholesteric liquid crystal film 13, thereby forming a second cholesteric liquid crystal film 13' in the uncured state (FIG. 3(e)).

Radiation 20 is then selectively applied to the desired portions of the second cholesteric liquid crystal film 13' through a photomask 14' whose openings are in a pattern different from that of the openings of the photomask 14, thereby partially curing the second cholesteric liquid crystal film 13' (FIG. (f)). By this, those portions of the second cholesteric liquid crystal film 13' corresponding to the openings 14a' of the photomask 14' are cured (cured portions 13a'), and the other portions of the second cholesteric liquid crystal film 13' remain uncured (uncured portions 13b').

Thereafter, the glass substrate 11 provided with the alignment layer 12, on which the cholesteric liquid crystal films 13 and 13' have been formed, is immersed in an organic solvent 22 placed in a barrel 21 to bring the partially cured second cholesteric liquid crystal film 13' into contact with the organic solvent 22. By rocking the barrel 21 with the glass substrate 11 fixed in the barrel 21, the uncured portions 13b' of the second cholesteric liquid crystal film 13' are removed (FIG. 3(g)).

The second cholesteric liquid crystal film 13' patterned as desired, not superposed on the first cholesteric liquid crystal film 13, is thus formed on the glass substrate 11 provided with the alignment layer 12.

An additional or third cholesteric liquid crystal film 13" is then formed and patterned in the same manner as the above-described one. By this, the third cholesteric liquid crystal film 13" patterned as desired, not superposed on either the first cholesteric liquid crystal film 13 or the second cholesteric liquid crystal film 13', is formed on the glass substrate 11 provided with the alignment layer 12.

Thus, an optical element 10 having the cholesteric liquid crystal films 13, 13' and 13" patterned as desired, formed on the glass substrate 11 provided with the alignment layer 12, is finally obtained (FIG. 3(i)).

In the method shown in FIG. 3, if the step of forming the cholesteric liquid crystal films 13, 13' and 13" on the glass substrate 11 provided with the alignment layer 12 and the step of patterning these films are successively repeated for each of three radiation-curing liquid crystals having different selective reflection wavelengths of red, green and blue, a color filter having red-, green- and blue-colored patterns can successfully be obtained as the optical element 10.

According to the aforementioned embodiments, the first cholesteric liquid crystal film 13 in the desired pattern is obtained by selectively applying radiation 20 to the desired portions of the first cholesteric liquid crystal film 13 formed on the glass substrate 11 provided with the alignment layer 12, so as to partially cure the first cholesteric liquid crystal film 13, and then bringing the partially cured first cholesteric liquid crystal film 13 into contact with the organic solvent 22 to remove the uncured portions 13b of the first cholesteric liquid crystal film 13. It is, therefore, possible to pattern the first cholesteric liquid crystal film 13 as desired with high accuracy and efficiency while maintaining film-thickness precision high.

In particular, according to the aforementioned embodiments, in the aforementioned step of selectively applying radiation 20 to the desired portions of the cholesteric liquid crystal films 13 and 13' so as to partially cure them, the radiation-applied-portions of the cholesteric liquid crystal films 13 and 13' are cured to such an extent that 90% or more of the radiation-curing liquid crystal is cured. Also, in the aforementioned step of bringing the partially cured cholesteric liquid crystal films 13 and 13' into contact with the organic solvent 22 to remove the uncured portions of them, as the organic solvent 22, an organic solvent that does not dissolve the surface of the glass substrate 11 provided with the alignment layer 12 is used. Therefore, even when a radiation-curing liquid crystal is applied again to the surface of the cholesteric liquid crystal films 13 and 13' or to the surface of the glass substrate 11 provided with the alignment layer 12, liquid crystalline molecules in this liquid crystal are properly aligned. It is thus possible to form, on one glass substrate 11, a plurality of cholesteric liquid crystal films 13, 13' and 13" in the same pattern or in different patterns, with high precision and efficiency.

EXAMPLES

The aforementioned embodiments of the present invention will now be explained more specifically by referring to the following Examples.

Example 1

In toluene were dissolved: 89 parts of a monomer containing, in its molecules, polymerizable acrylates at both ends and spacers between mesogen existing at the center and the acrylates, having a liquid crystalline phase transition temperature of 100° C.; and 11 parts of a chiral agent having, in its molecule, polymerizable acrylates at both ends. To this toluene solution was added a photopolymerization initiator ("Irg 184" available from Ciba Specialty Chemicals K.K., Japan) in an amount of 5% by weight of the above-described monomer.

Separately, polyimide was applied to a glass substrate; and the polyimide film formed was rubbed in a definite direction to make it into an alignment layer.

The glass substrate provided with this alignment layer was set in a spin coater; and the alignment layer was spin-coated with the above-prepared toluene solution so that the thickness of the toluene solution applied would be approximately 10 $\mu$m The glass substrate coated with the toluene solution was heated at 80° for 1 minute to evaporate the toluene contained in the toluene solution. It was visually confirmed, by way of selective reflection of light, that the liquid crystal film in the uncured state thus formed on the alignment layer was cholesteric.

To this cholesteric liquid crystal film in the uncured state, 100 mJ/cm$^2$ of ultraviolet light was applied by the use of an ultraviolet light irradiator through a photomask having openings in a specific pattern. The above irradiation dose of ultraviolet light was set so that the ultraviolet-light-applied-portions of the cholesteric liquid crystal film would have a degree of polymerization (curing) of 90% or more.

Thereafter, the glass substrate provided with the alignment layer, on which the cholesteric liquid crystal film had been formed, was immersed in acetone placed in a barrel; and the barrel was rocked for 1 minute to remove the uncured portions of the cholesteric liquid crystal film.

The glass substrate was then taken out from the acetone and was dried. There was thus finally obtained an optical element having the cholesteric liquid crystal film patterned as desired, where only the ultraviolet-light-applied portions of the cholesteric liquid crystal film were left on the substrate in the desired pattern, and the other portions of the cholesteric liquid crystal film were removed to expose the alignment layer.

It was confirmed that the cholesteric liquid crystal film formed in this example was nearly uniform in thickness (3 µm) and that the pattern formed was extremely precise.

Example 2

On the glass substrate provided with the alignment layer having thereon the cholesteric liquid crystal film patterned as desired, produced in Example 1, an additional cholesteric liquid crystal film was formed and patterned in the same manner as in Example 1.

The pattern of this newly formed additional cholesteric liquid crystal film was different from that of the cholesteric liquid crystal film formed in Example 1. Namely, a part of the patterned additional cholesteric liquid crystal film was present on the surface of the patterned cholesteric liquid crystal film formed in Example 1, and the rest of the patterned additional cholesteric liquid crystal film was present on the exposed surface of the alignment layer.

It was confirmed that the additional cholesteric liquid crystal film formed in this example was nearly uniform in thickness (3 µm) and that the pattern formed was extremely precise. In addition, although the patterned additional cholesteric liquid crystal film formed in this example is superposed both on the patterned cholesteric liquid crystal film formed in Example 1 and on the glass substrate, the entire additional cholesteric liquid crystal film was found to be excellent in the state of alignment of liquid crystalline molecules.

Example 3

In the composition of the toluene solution used in Example 1, the amount of the chiral agent was changed to prepare three liquid crystals having selective reflection wavelengths of red, green and blue.

The same steps of forming and patterning a cholesteric liquid crystal film as those in Example 2 were repeated for each of these three cholesteric liquid crystals, provided that the patterning was conducted so that the resulting three cholesteric liquid crystal films would not be superposed on each other. Thus, a color filter having red-, green- and blue-colored patterns was obtained.

It was confirmed that the patterned cholesteric liquid crystal films of red, green and blue formed in this example, constituting the color filter, were nearly uniform in thickness (3 µm) and that the patterns formed were extremely precise. In addition, all of these additional cholesteric liquid crystal films of red, green and blue were found to be excellent in the state of alignment of liquid crystalline molecules.

Example 4

In the composition of the toluene solution used in Example 1, the amount of the chiral agent was changed to prepare seven liquid crystals having different selective reflection wavelengths.

The same steps of forming and patterning a cholesteric liquid crystal film as those in Example 2 were repeated for each of these seven cholesteric liquid crystals, provided that the patterning was conducted so that the resulting seven cholesteric liquid crystal films would be superposed on each other, thereby obtaining a laminate of the seven patterned cholesteric liquid crystal films having different selective reflection wavelengths. There was thus obtained a circularly polarizing element containing the laminate of the cholesteric liquid crystal films as a reflective layer (silver in color) capable of selectively reflecting light in the whole visible range (400–750 nm).

It was confirmed that the laminate of the cholesteric liquid crystal films formed in this example, constituting the circularly polarizing element was nearly uniform in thickness (20 µm) and that the pattern formed was extremely precise. In addition, all of the patterned additional cholesteric liquid crystal films formed in this example were found to be excellent in the state of alignment of liquid crystalline molecules.

What is claimed is:

1. A method of producing an optical element by patterning a plurality of liquid crystal films, comprising:
   applying a first radiation-curing liquid crystal to a surface of a substrate having an aligning function to form a first liquid crystal film on the substrate in an uncured state;
   selectively applying radiation to the uncured first liquid crystal film to form at least one cured region and at least one uncured region of the first liquid crystal film;
   contacting the at least one uncured region with an organic solvent to remove the at least one uncured region of the first liquid crystal film while retaining the at least one cured region; and
   applying a second radiation-curing liquid crystal to an exposed surface of the substrate exposed by removal of the at least one uncured region to form a second liquid crystal film on the exposed surface;
   wherein the organic solvent is a solvent that does not dissolve the exposed surface so that the exposed surface retains the aligning function after exposure to the organic solvent.

2. The method according to claim 1, wherein:
   the second radiation-curing liquid crystal is applied to the exposed surface of the substrate and to a surface of the at least one cured region; and
   the at least one cured region is cured to such an extent that at least 90% of crystalline molecules of the at least one cured region are cured to provide the surface of the at least one cured region with the aligning function.

3. The method according to claim 1, wherein the first and second liquid crystal films have cholesteric regularity.

4. The method according to claim 1, wherein applying the second radiation-curing liquid crystal to the exposed surface, comprises:
   applying the second radiation-curing liquid crystal to the exposed surface of the substrate to form a second liquid crystal film on the substrate in an uncured state;
   selectively applying radiation to the uncured second liquid crystal film to form a second at least one cured region and a second at least one uncured region of the second liquid crystal film; and contacting the second at least one uncured region with an organic solvent to remove the second at least one uncured region of the second liquid crystal film while retaining the second at least one cured region.

5. The method according to claim 1, wherein the organic solvent is a member selected from the group consisting of acetone, 3-methoxybutyl acetate, diglyme, cyclohexanone, tetrahydrofuron, toluene, methylene chloride, and methyl ethyl ketone.

* * * * *